June 18, 1963 G. C. CURRIE 3,094,134
DISPERSING DEVICE
Filed March 2, 1961 5 Sheets-Sheet 2

INVENTOR:
GROVER C. CURRIE

BY Eaton, Bell, Hunt & Seltzer
ATTORNEYS

United States Patent Office 3,094,134
Patented June 18, 1963

3,094,134
DISPERSING DEVICE
Grover C. Currie, Charlotte, N.C., assignor to Fulbright Laboratories, Inc., Charlotte, N.C., a corporation of North Carolina
Filed Mar. 2, 1961, Ser. No. 92,948
15 Claims. (Cl. 137—132)

This invention relates to dispersing devices and, more particularly, to an improved device for regularly dispersing desired amounts of soluble solid material in liquid.

Devices of the type described generally above have been heretofore proposed, and are capable of various different usages. One such use, in connection with which the instant invention will be described hereinafter for purposes of illustration, is in association with air conditioning systems employing large quantities of cooling water. Bacteria and minerals in the water of such a system will, unless controlled, produce slime and scale that can eventually render the system inoperative. This undesirable result can be prohibited by the regular introduction into the cooling water of chemicals that will control the bacteria and minerals that are the source of slime and scale. Various suitable chemicals are available for this purpose, one type being sold, so as to permit convenient handling, in the form of water soluble brickettes or small disc-like cakes. The introduction of such chemical cakes or brickettes into the cooling water of an air conditioning system can be accomplished manually. This procedure, however, is troublesome and expensive, and also all too frequently results in the introduction of either too much or too little chemical. Accurate, automatic dispersing of the chemical cakes is therefore far preferable, and, as noted previously herein, devices intended for this purpose have been heretofore proposed. The prior devices, however, have possessed various deficiencies and shortcomings, including their being expensive to manufacture, install, and maintain, difficult to adjust to the exact requirements of a cooling system, and unreliable in operation.

Among the objects of the instant invention, therefore, is the provision of a dispersing device suitable for the above-described and many other uses, which device is of compact and economical construction, which is easy to install and which requires a minimum of maintenance, which will regularly and automatically disperse the exact desired quantity of soluble material in liquid, which may be quickly and easily adjusted to vary as desired the quantity of soluble material dispersed in liquid, which achieves through admixing of the soluble material and liquid, and the operation of which is controlled by the operation of the system in which it is employed so that upon the system ceasing to operate the device will also cease to disperse.

A related and more specific object is the provision of a device of the type described embodying adjustable siphonic means which render the device capable of rapid adjustment to vary, as desired, the amount of soluble material dispersed in the liquid.

Still other objects and advantages will be in part evident and in part pointed out hereinafter in the following description of illustrative embodiments of the invention, which should be read in conjunction with the accompanying drawings, in which—

Figure 1:
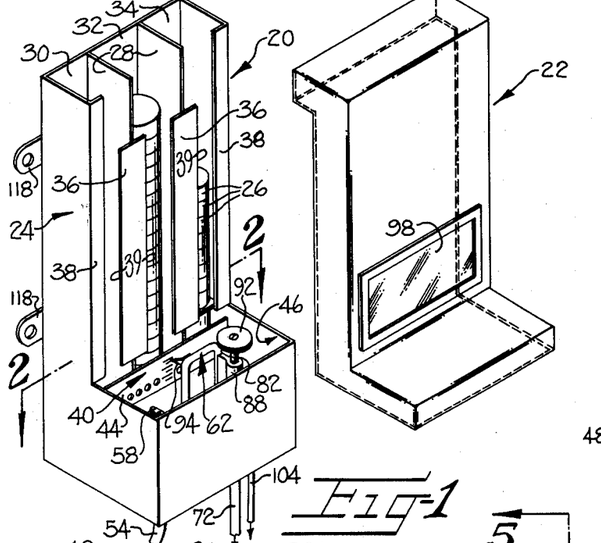
FIGURE 1 is a front perspective view of the device with its cover removed.

Referring more particularly to the drawings, the device shown in FIGURE 1 consists of a generally L-shaped hollow frame 20 and a removable cover 22 therefor. When cover 22 is in place on frame 20 (see FIGURE 10), the device is closed on all sides, which renders it substantially weather-proof and additionally discourages unauthorized persons from tampering with the mechanisms and materials, to be subsequently described, therewithin. Frame 20, cover 22, and the various other components of the device to be discussed subsequently may be constructed of any suitable materials, such as metal or plastic, that are resistant to mild chemical action and to the effects of weather.

Figure 3:
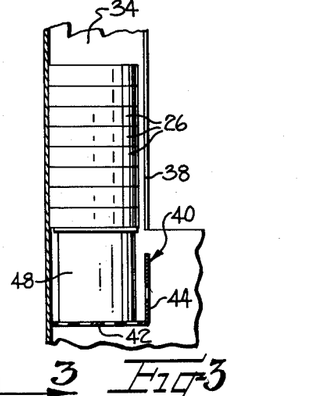
FIGURE 3 is a fragmentary section taken substantially along line 3—3 of FIGURE 2.

The upper, substantially vertical portion of frame 20 constitutes a hopper 24 for reception and storage of the soluble solid material to be dispersed. In FIGURES 1 and 3, the soluble material to be dispersed is shown in the form of disc-like brickettes or cakes 26 stacked on top of each other to form columns. It will become apparent subsequently, however, that soluble material molded into other shapes, for instance, solid columns of either circular or other cross-sectional configuration, might be employed in the device, and therefore no restriction to the particular molded shape of the soluble material dispersed by the device is intended or should be made. Partitions 28 divide hopper 24 into a plurality of racks 30, 32, 34, each of which is adapted to loosely receive a column of cakes 26. Restraining strips 36 on partitions 28 and flanges 38 on hopper 24 prevent any tendency of the columns of cakes 26 to fall laterally out of racks 32, 34, 36, and also define finger slots 39 which permit convenient insertion of the columns of cakes 26 into the hopper.

Figure 2:
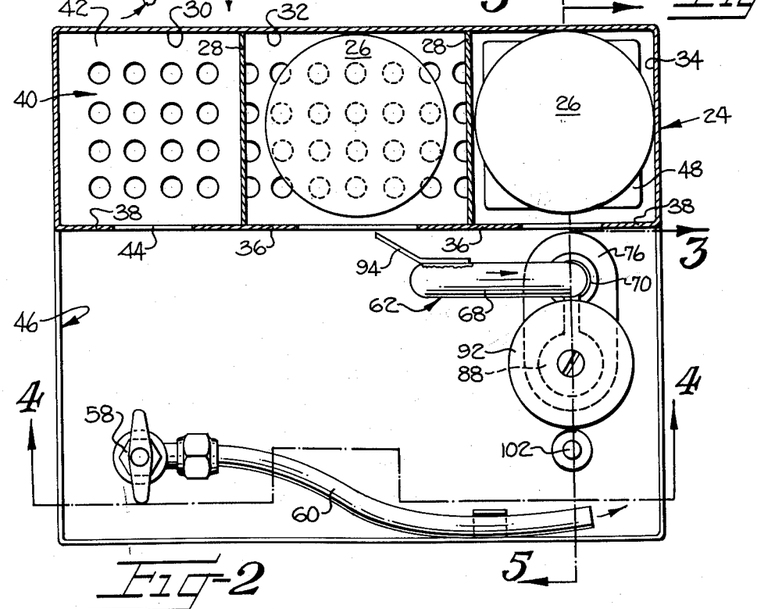
FIGURE 2 is a horizontal section of the device taken substantially along line 2—2 of FIGURE 1.

A shelf 40 having a perforated bottom wall 42 and a perforated front wall 44 is mounted within and intermediate the top and bottom of the lower portion of frame 20, which lower portion defines a mixing vessel or container 46. Shelf 40 is disposed directly beneath hopper 24 and is intended to support the columns of cakes 26 arranged in racks 30, 32, 34 thereof. The lower end of the column or columns of cakes 26 within hopper 24 that are actually being dispersed by the device while it is in operation rest directly on perforated bottom wall 42 of shelf 40, as illustrated in FIGURES 1 and 2 by the column of cakes 26 in rack 32 of hopper 24. It is sometimes desirable to utilize one or even two of the racks 30, 32, 34 of hopper 24 merely for storage of cakes 26, and not for dispersal. At such times, a removable insert 48 may be positioned upon bottom wall 42 of shelf 40 beneath the column of cakes 26 which it is desired to merely store and not to disperse, as illustrated by the column of cakes 26 in rack 34 of hopper 24 in FIGURES 1 through 3. Insert 48 may be of any suitable construction so long as it possesses a sufficient height to maintain the lower end of a column of cakes 26 above the maximum liquid level in container 46. The insert 48 illustrated in FIGURE 3 is, it will be noted, of such a height as to maintain the lower end of the column of cakes 26 that it supports slightly above the upper edge of container 46 of frame 20. An insert 48 may be provided for each of the racks 30, 32, 34 of hopper 24, and those inserts not in use may be stored atop the upper cake 26 in their respective racks.

Figures 4, 5:
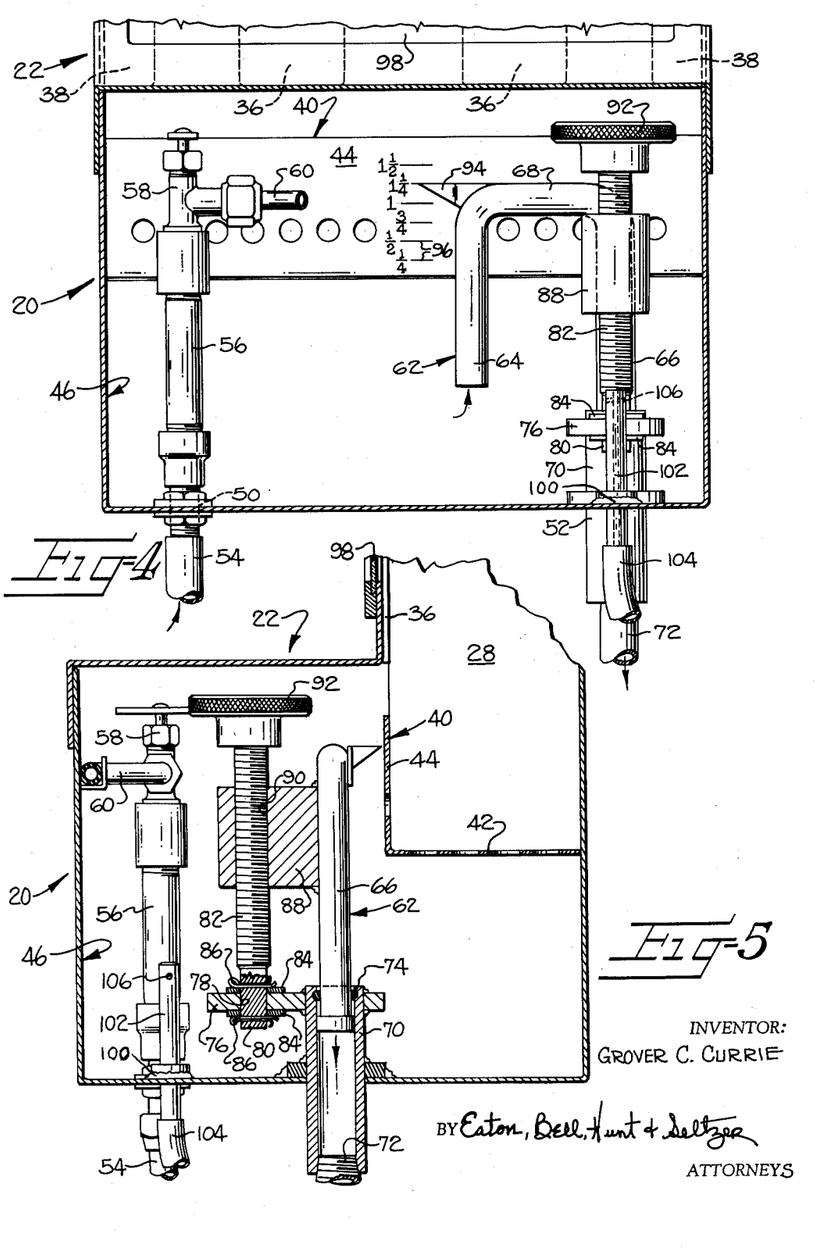
FIGURE 4 is a vertical section of the lower part of the device taken substantially along line 4—4 of FIGURE 2, the chemical cakes and insert not being shown but including the cover.
FIGURE 5 is a vertical section of the lower portion of the device taken substantially along line 5—5 of FIGURE 2, the chemical cakes and insert not being shown but including the cover.
Figure 6:
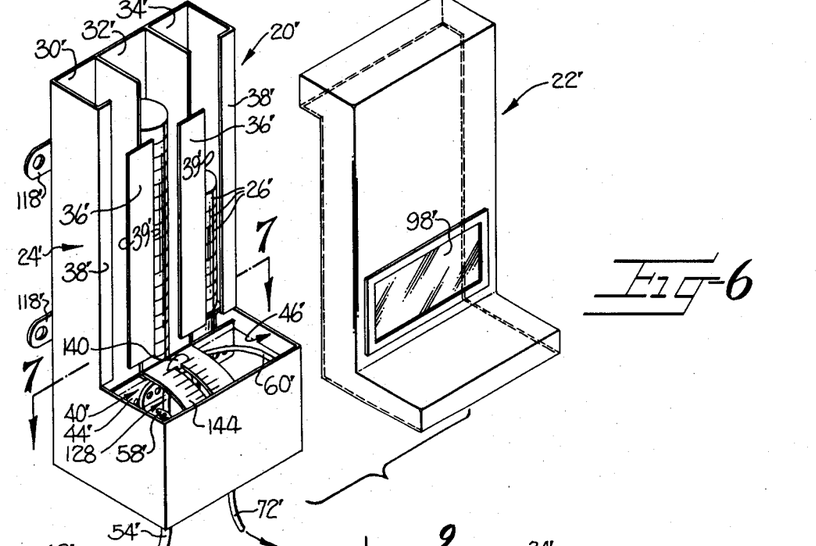
FIGURE 6 is a front perspective view of a second embodiment of the device with its cover removed.

Referring now primarily to FIGURES 2, 4 and 5, container 46 is provided in its bottom wall with a liquid inlet 50 and a liquid outlet 52. When the dispersing device is in operation, a continuous flow of liquid is introduced into container 46 through inlet 50 by means of liquid inlet line 54, fitting 56, metering valve 58, and conduit 60. This liquid introduced into container 46 is periodically and intermittently discharged therefrom through liquid outlet 52 by means of a siphon 62, including legs 64, 66 and connecting portion 68, fitting 70, and liquid outlet line 72. The liquid flow path into and out of container 46 is indicated in FIGURE 4 by arrows. In accordance with well-known principles of siphonic action, it will be apparent that liquid will not be discharged from container 46 through liquid outlet 52 until such time as the continuous introduction of liquid into the container through inlet 50 has raised the liquid level therein to a height sufficient to establish flow through connecting portion 68 of siphon 62. At such time as this flow is established, liquid will be discharged by siphonic action from container 46 through siphon 62, fitting 70, liquid outlet 52, and line 72. The rate of liquid flow into container 46 through inlet 50 is adjusted, by means of needle valve 58 and at the time when the device is initially installed in a system, so as to be substantially less than the rate of siphonic discharge of liquid from the container through outlet 52. Consequently, once siphonic discharge of the liquid has commenced the liquid level in the container will decline. Siphonic discharge and lowering of the liquid level in container 46 will continue until the liquid level falls to a height immediately below the free lower end of leg 64 of siphon 62. When the liquid level falls to this point, the siphonic effect is broken. No further discharge of liquid from container 46 will then occur until once again the continuous introduction of liquid through inlet 50 has raised the liquid level in container 46 to a height sufficient to re-establish flow through connecting portion 68 of siphon 62.

The cycle of continuous introduction of liquid and intermittent or periodic liquid discharge will be repeated automatically as long as the device is in operation. During a portion of each cycle of operation of the device, the liquid in container 46 will be in contact with and immerse a portion of the lower ends of whichever columns of cakes 26 are supported directly by shelf 40. As best seen in FIGURES 4 and 5, this period of immersion of cakes 26 will occur when the liquid level in container 46 is above bottom wall 42 of shelf 40. The liquid level in container 46 will be above bottom wall 42 of shelf 40 during a portion of both the filling and discharge phases of each cycle; that is, both during the phase when the continuous introduction of liquid into container 46 is raising the liquid level therein from bottom wall 42 of shelf 40 to a height at which communication is established through connecting portion 68 of siphon 62, and during that portion of the discharge phase of each cycle when the liquid level in container 46 is being lowered from the height of connecting portion 68 of siphon 62 to the height of bottom wall 42 of shelf 40. During these portions of both the filling and discharge phases of each cycle of operation of the device, the immersed lower portion of the columns of cakes 26 supported by bottom wall 42 of shelf 40 will be dissolved by the liquid in contact therewith. Dissolving of the cakes 26 is assisted by the eroding action of the liquid which, while in contact with the cakes, is either rising or falling with respect thereto and which also possesses a swirling or mixing action due to conduit 60 introducing the same into container 46 substantially tangentially of the front wall of the container. As the lower portions of the columns of cakes supported directly at their lower ends by bottom wall 42 of shelf 40 are immersed and dissolved by the liquid during each cycle of operation, these columns drop downwardly in hopper 24 under the influence of their own weight so as to station additional cakes 26 in a position to be dissolved during the following operating cycles of the device. As noted previously, racks 30, 32, 34 of hopper 24 receive the columns of cakes 26 sufficiently loosely so as to not in any way impede this downward movement of the columns as the lower end portions thereof are immersed and dissolved by the liquid in container 46. The liquid discharged through liquid outlet 52 via siphon 62 constitutes, of course, a solution or dispersion of the soluble material of cakes 26 dissolved thereby.

From the description thus far advanced, it will be apparent that the amount of soluble material of cakes 26 immersed and dissolved by the liquid in container 46 during each cycle of operation is primarily dependent upon the height above bottom wall 42 of shelf 40 that the liquid level in container 46 is permitted to attain prior to initiation of siphonic discharge. This, in turn, is dependent upon the height of connecting portion 68 of siphon 62 above bottom wall 42 of shelf 40. Therefore, by varying the height of connecting portion 68 of siphon 62, the concentration of the soluble material of cakes 26 in the liquid discharged from the device during each cycle of operation will be varied. The capability of being able to vary the concentration of the liquid dispersion or solution discharged is extremely desirable, inasmuch as it enables the device to be adapted to the particular needs of different systems in which it might be incorporated, or to any varying needs which might arise in a single system.

This capability is achieved in the FIGURES 1 through 5 embodiment of the invention by means best seen in FIGURES 4 and 5. As shown therein, leg 66 of siphon 62 is mounted for sliding, telescopic movement within fitting 70 of liquid outlet 52. An O-ring seal 74 is provided between the outer wall of leg 66 and the inner wall of fitting 70 to prevent leakage therebetween, while still permitting relative sliding movement between these members. It will be noted that O-ring 74 does not necessarily have to provide a perfect seal inasmuch as the sliding connection between leg 66 and fitting 70 is disposed entirely within container 46 where, if some slight leakage should occur, there would be no detrimental consequences. Secured to and extending at right angles from fitting 70 is an ear 76 having a vertical bore 78. The smooth cylindrical lower end 80 of a screw 82 is journaled within bore 78, washers 84 and cotter pins 86 being provided as shown to prevent vertical displacement of the screw relative to ear 76. Secured to siphon 62 is a lug 88 having an internally threaded bore 90. Bore 90 receives and is threadably engaged by screw 82, so that upon rotation of the screw by means of an operating knob 92 provided upon the upper end thereof, lug 88 will travel longitudinally of screw 82. This movement of lug 88 produces a corresponding movement of siphon 62, varying the vertical position of the siphon relative to container 46. Rotation of operating knob 92 in a first direction will raise siphon 62 so as to increase the liquid level height above bottom wall 42 of shelf 40 at which discharge of liquid from container 46 will be initiated, thereby increasing the amount of the columns of cakes 26 immersed by the liquid prior to and during discharge and also increasing the time of immersion during each cycle of the device. Raising of siphon 62 in this manner therefore causes a more concentrated solution or dispersion of liquid and soluble material to be discharged from container 46 during each cycle of the device. Conversely, rotation of operating knob 92 in the opposite direction and lowering of siphon 62 has the opposite effect.

A pointer 94 is carried by and movable with siphon 62 so as to register with a calibrated scale 96 which may conveniently be disposed upon front wall 44 of shelf 40, as shown in FIGURE 4. In FIGURE 4, the indicia of scale 96 to which pointer 94 is directed discloses the height above wall 42 of shelf 40 to which the liquid level in container 46 will rise prior to the initiation of liquid discharge through siphon 62. This height, of course, corresponds to the maximum depth to which the lower end portions of the columns of cakes 26 will be immersed by the liquid in container 46 prior to discharge. It will be apparent that indicia of other types might be employed upon scale 96 in lieu of or in addition to that shown. For instance, the indicia might indicate directly the concentration of the liquid dispersion or solution discharged through siphon 62 at each different adjusted position thereof. In some instances it might be desirable to provide three sets of indicia of this latter type so that one set might be properly employed irrespective of whether one, two, or all three of the racks 30, 32, 34 of hopper 24 were being actively employed for the dispersion of the material of cakes 26.

It will be appreciated from the previous description that so long as a supply of cakes 26 is maintained upon bottom wall 42 of shelf 40, the dispersing device of FIGURES 1 through 5 will operate automatically merely by virtue of the continuous introduction of liquid into container 46 through liquid inlet 50 and its associated components. Conversely, upon cessation of the introduction of liquid into container 46, as might occur by shutting down of the entire system in which the dispersing device is incorporated, the device will automatically cease its function. Thus, in addition to liquid outlet 52, there is also provided in the bottom wall of container 46 a drain outlet 100 through which extends a suitable fitting 102 that is connected at its lower end to a drain line 104. Fitting 102 is provided with a small orifice 106 through which liquid in container 46 will continuously drain during operation of the device. The rate of flow of liquid through orifice 106 is sufficiently small, however, due to the restricted size of orifice 106, in relation to the rate of inflow of liquid through inlet 50 as to not interfere with the above-described operation of the device when the inflow of liquid is continuous. Upon cessation of the introduction of liquid through inlet 50, however, liquid will be slowly drained off through fitting 102 and drain line 104 until the liquid level in container 46 reaches a point immediately below orifice 106. Absent this provision, if the liquid inflow into container 46 should cease subsequent to the liquid level in the container rising above bottom wall 42 of shelf 40 and prior to the initiation of siphonic discharge through siphon 62, the lower end of the column or columns of cakes 26 supported by bottom wall 42 of shelf 40 would be continuously immersed and dissolved by liquid in container 46 during the entire period when the device was out of operation. Dispersion of the entire column or columns of cakes 26, or saturation of the residual liquid in container 46, could then result. The provision of the instant drain means obviates the possibility of either of these undesirable results occurring.

Figure 10:
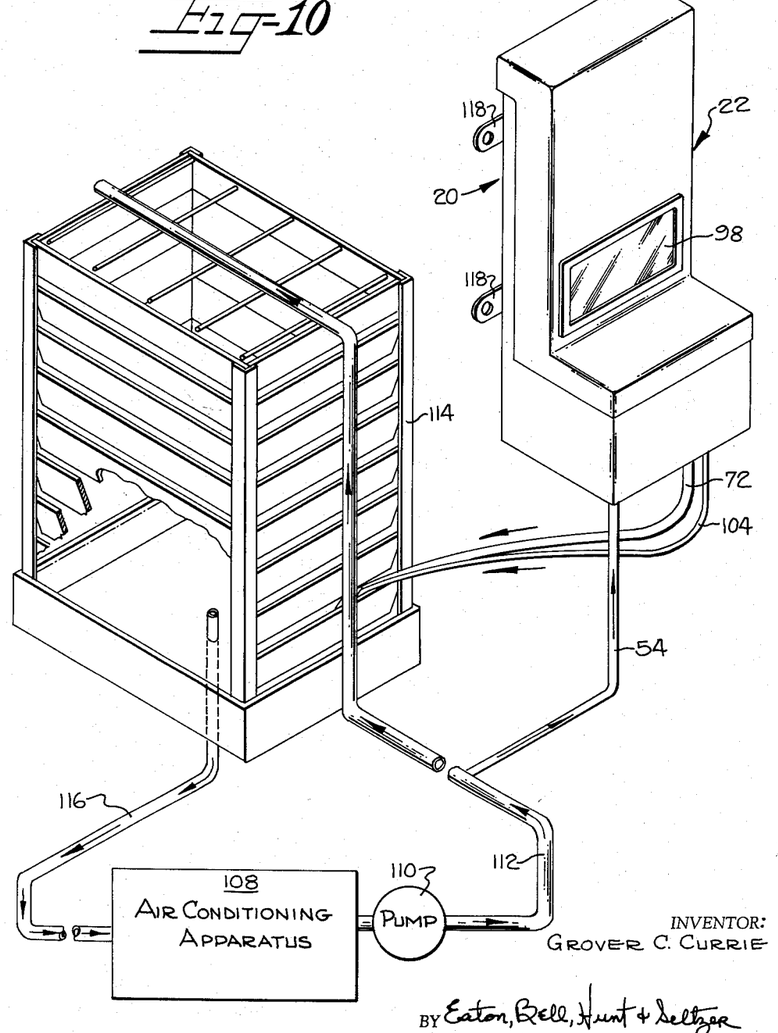
FIGURE 10 is a schematic view of the device in use in an air conditioning system.

Referring now to FIGURE 10, an illustrative use of the device is shown by its installation in an air conditioning system including air conditioning apparatus 108, pump 110, conduit 112, cooling tower 114 and return conduit 116. In installing the dispersing device of the instant invention in such a system, frame 20 is mounted in proximity to, and above the collecting trough of, cooling tower 114. As shown in FIGURES 1 and 10, ears 118 may be provided on frame 20 to facilitate its mounting. At some point intermediate pump 110 and cooling tower 114, liquid inlet line 54 of the dispersing device is connected to conduit 112 of the air conditioning system. Liquid outlet line 72 and drain line 104 of the dispersing device are positioned so as to discharge, by gravity, into the collecting trough of cooling tower 114. Needle valve 58 of the device is adjusted to meter a predetermined continuous flow of liquid from conduit 112 and inlet line 54 into container 46 during the time that pump 110 is in operation. A supply of chemical cakes 26 is placed in hopper 24 of the device, either one, two, or all three of the racks of hopper 24 being utilized, depending upon the needs of the particular system. If in a particular system only one or two of the racks of hopper 24 need be employed, then the remaining rack or racks may be left empty or, as noted heretofore, may be employed merely for storage of cakes 26 by use of one or more of inserts 48. The position of siphon 62 is adjusted by rotating knob 92 so that, as indicated by scale 96 and pointer 94, the concentration of the liquid dispersion or solution discharged through line 72 into cooling tower 114 will exactly meet the requirements of the particular air conditioning system. Cover 22 can then be placed upon frame 20, and the device will thereafter function completely automatically except for infrequent recharging of the supply of chemical cakes 26 in hopper 24. A window 98 is provided in cover 22 of the device to permit persons to view the supply of cakes 26 within hopper 24 and thereby ascertain, without removing cover 22, when the supply needs replenishing. As noted previously, the device ceases to function when the parent system shuts down and pump 110 stops. At such times the liquid in container 46 is lowered to a level beneath bottom wall 42 of shelf 40 by draining thereof through line 104 into cooling tower 114, so as to prevent further dispersion of the cages 26 or saturation of the residual liquid within the container. Of course, resumption of the operation of pump 110 automatically reinitiates operation of the dispersing device.

If at some future date the requirements of the system in which the dispersing device is installed should change, the concentration of the liquid dispersion or solution discharged by the device into cooling tower 114 can be adjusted accordingly. This can be accomplished in most instances simply by adjusting the position of siphon 62 through rotation of operating knob 92 in the appropriate direction. If in some rare situations the range of adjustment of siphon 62 is not sufficient to get the desired results, then additionally one or more of the racks 30, 32, 34 of hopper 24 may be introduced into or withdrawn from active service; that is, a rack previously left empty or merely storing, by use of an insert 48, a column of cakes 26 might be employed to contain a column of cakes supported directly at its lower end by bottom wall 42 of shelf 40, and vice versa. The capability of varying both the number of columns of cakes 26 being dispersed by the device and the position of siphon 62 affords a range of adjustment encompassing the needs of almost any system.

The embodiment of the invention dislcosed in FIGURES 6 through 9 is structurally and functionally similar to the FIGURES 1 through 5 embodiment, previously described, and to avoid repetitious description those parts of the second embodiment of the device identical or similar to parts of the first embodiment have been identified by the same reference numeral with the addition of a prime designation.

Thus, as seen in FIGURES 6 through 9, the second embodiment of the invention comprises a generally L-shaped frame 20' including hopper 24', container 46' and perforated shelf 40'. A removable cover 22' having a window 98' is provided for frame 20'. Liquid is continuously introduced into container 46' during the operation of the device through inlet line 54', inlet 50', fitting 56', needle valve 58', and conduit 60'. Conduit 60' is positioned so as to discharge liquid substantially tangentially of a wall of container 46', so as to impart a swirling action to the liquid, in keeping with the positioning of conduit 60 of the FIGURES 1 through 5 embodiment. In the latter embodiment, however, the discharge of liquid from conduit 60' is tangential to a side wall of container 46', rather than to the front wall as in the case of the previous embodiment.

Figure 7:
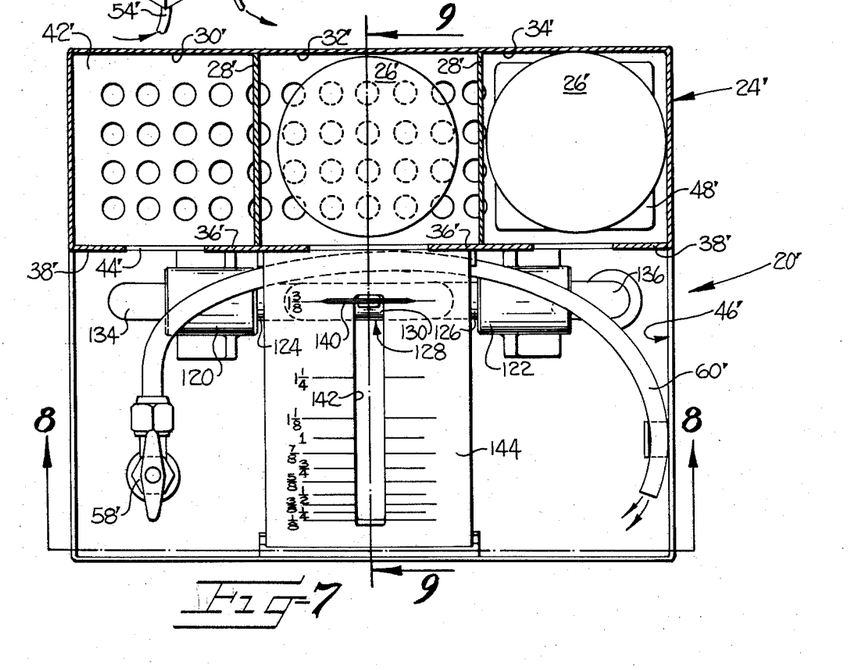
FIGURE 7 is a horizontal section of the second embodiment of the device taken substantially along line 7—7 of FIGURE 6.
Figure 8:
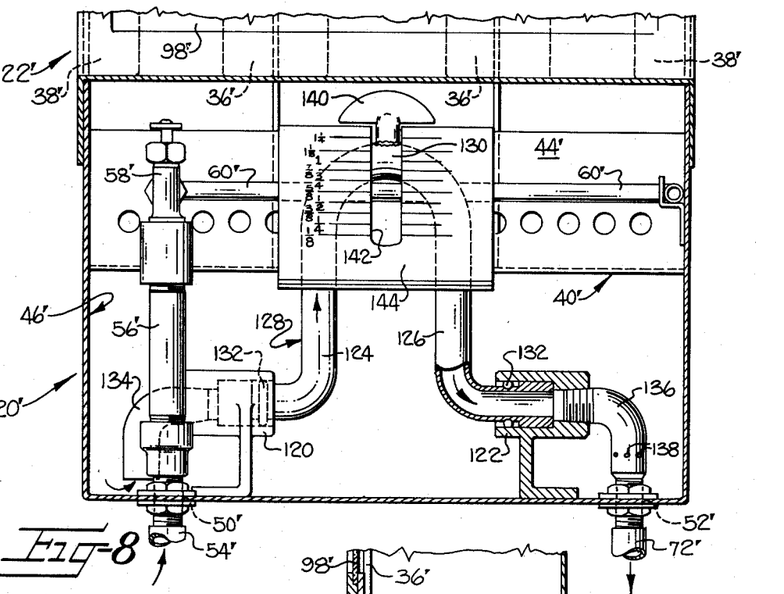
FIGURE 8 is a vertical section of the lower portion of the second embodiment of the device taken substantially along line 8—8 of FIGURE 7, the chemical cakes and insert not being shown but including the cover.
Figure 9:
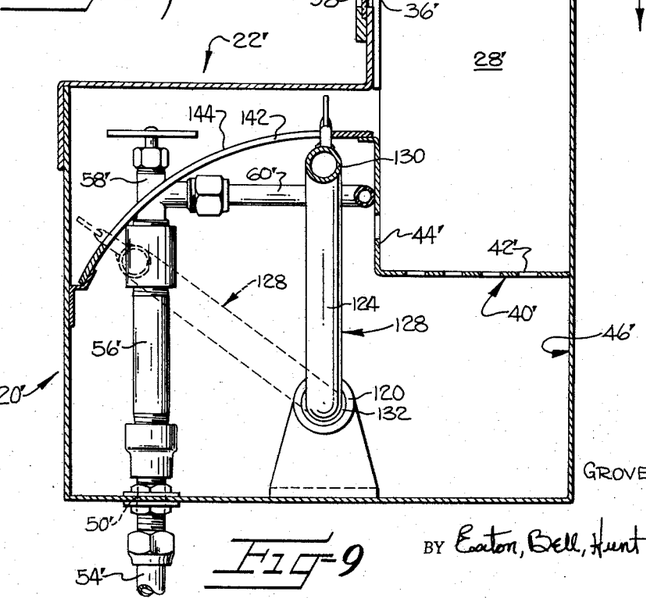
FIGURE 9 is a vertical section of the lower portion of the second embodiment of the device taken substantially along line 9—9 of FIGURE 7, the chemical cakes and insert not being shown but including the cover.

The primary difference in the two embodiments of the invention resides in the siphonic means for regulating the maximum level attained by liquid in container 46' prior to initiation of discharge of the liquid dispersion or solution from the container. While both embodiments of the invention employ a vertically adjustable siphon for this purpose, the siphon of the FIGURES 6 through 9 embodiment is pivotally, rather than slidably, adjustable. Thus, as best seen in FIGURES 7 through 9, a pair of bearings 120, 122 are mounted upon the bottom wall of container 46'. Journaled for rotative movement within bearings 120, 122 are the legs 124, 126, respectively, of a siphon 128 having a connecting portion 130. O-rings 132 provide a seal between the legs of siphon 128 and bearings 120, 122, while still permitting relative rotative movement therebetween. Rigidly secured to bearing 120 and communicating leg 124 of siphon 128 with the interior of container 46' is an elbow fitting 134. A fitting 136, similar to fitting 134 but provided with a plurality of orifices 138, is secured to bearing 122 and communicates leg 126 of siphon 128 with outlet 52' of container 46' and with line 72'. Orifices 138 serve to drain residual liquid from container 46' when the dispersing device is out of operation, similar to orifice 106 of the FIGURES 1 through 5 embodiment. By virtue of orifices 138 directly communicating the interior of container 46' and line 72', however, it will be noted that a separate drain system, such as in the first described embodiment, is not needed and is eliminated.

It will be appreciated that the maximum level to which liquid will rise in container 46' prior to the initiation of discharge through siphon 128 and liquid outlet 52' can be varied by pivotally adjusting the position of siphon 128, which pivotal adjustment will vary the vertical position of connecting portion 130 of the siphon relative to container 46'. To facilitate pivotal adjustment of siphon 128, a combination operating lever and pointer 140 is secured to connecting portion 130 thereof. Lever 140 extends through slot 142 in an arcuate scale 144 secured at its opposite ends to front wall 44' of shelf 40' and to the front wall of container 46'. Scale 144, in keeping with scale 96 of the previously described embodiment, may contain various types of indicia indicating, for instance, the extent of immersion of the soluble cakes in hopper 24', or the concentration of the liquid dispersion or solution discharged from container 46', for each adjusted position on siphon 128. A further description of the modes of installation, adjustment and operation of the FIGURES 6 through 9 embodiment of the invention is deemed unnecessary, since these will be obvious from the foregoing description relative to the device of the FIGURES 1 through 5 embodiment.

It will thus be seen that the instant invention provides a dispersion device in which the various objects and advantages heretofore set forth, along with many practical benefits, are successfully realized and achieved. The device of the instant invention is of compact and economical construction, is easy to install and adjust, requires a minimum of maintenance, operates automatically in response to operation of its parent system, and disperses with a high degree of accuracy the desired amount of soluble material.

In the drawings and specification there have been set forth preferred embodiments of the invention and an illustrative usage thereof and, although specific terms are employed, they are used in a generic and descriptive sense only and not for purposes of limitation, the scope of the invention being defined in the claims.

That which is claimed is:

1. A device for dispersing soluble material in liquid comprising a container having an inlet, said liquid being continuously introduced into said container through said inlet while said device is in operation, means positioned within said container above the bottom thereof for supporting the lower end of an upright column of said material, said introduction of said liquid into said container raising the liquid level therein above said supporting means and the lower end of the column of said material and thereby immersing increasing amounts of said material in said liquid, and means in said container for rapidly discharging said liquid from said container and thereby lowering said liquid lever below said supporting means when said liquid level reaches a predetermined height in said container, said discharging means including a siphon mounted for adjustment relative to said container to vary said predetermined height at which said rapid discharge commences, whereby the extent to which said liquid immerses said column of said material prior to said rapid discharge can be varied.

2. A device for dispersing soluble material in liquid comprising a container having an inlet, said liquid being continuously introduced into said container through said inlet while said device is in operation, means positioned within said container above the bottom thereof for supporting the lower end of an upright column of said material, hopper means extending upwardly from said supporting means for loosely receiving the column of said material supported thereby, said introduction of said liquid into said container raising the liquid level therein above said supporting means and the lower end of the column of said material and thereby immersing and dissolving increasing amounts of said material in said liquid, the column of said material dropping downwardly in said hopper means as the lower end thereof is immersed and dissolved by said liquid, and means in said container for rapidly discharging said liquid from said container and thereby lowering said liquid level below said supporting means when said liquid level reaches a predetermined height in said container, said discharging means including a siphon mounted for adjustment relative to said container to vary said predetermined height at which said rapid discharge commences, whereby the extent to which said liquid immerses and dissolves said column of said material prior to said rapid discharge can be varied.

3. A device for dispersing soluble material in liquid comprising a container having an inlet, said liquid being continuously introduced into said container through said inlet while said device is in operation, means within said container for supporting the lower end of an upright column of said material, said introduction of said liquid into said container raising the liquid level therein above the lower end of the column of said material and thereby immersing increasing amounts of said material in said liquid, means in said container for rapidly discharging said liquid from said container and thereby lowering said liquid level when said liquid level reaches a predetermined height in said container, said discharging means including a siphon mounted for adjustment relative to said container to vary said predetermined height at which said rapid discharge commences, whereby the extent to which said liquid immerses said column of said material prior to said rapid discharge can be varied, and drain means in said container for discharging sufficient liquid therefrom when said device is inoperative as to lower said liquid level therein below the lower end of the column of said material.

4. A device for dispersing soluble material in liquid comprising a container having an inlet, means for metering a predetermined continuous flow of said liquid through said inlet into said container while said device is in operation, means carried by said container for supporting the lower end of a substantially vertical column of said material within said container, said predetermined continuous flow of said liquid into said container raising the liquid level therein above said lower end of said column of said material and thereby immersing increasing amounts of said material in said liquid, means in said container for rapidly discharging said liquid from said container and thereby lowering said liquid level therein when said liquid level reaches a predetermined height above said lower end of said column of said material, said discharging means including a siphon mounted for adjustment vertically of said container to vary said predetermined height at which said rapid discharge commences, whereby the extent to which said liquid immerses said column of said material prior to said rapid discharge can be varied, and drain means in said container for discharge sufficient liquid therefrom when said device is inoperative as to lower said liquid level therein below said lower end of said column of said material.

5. A device as in claim 4, wherein said means for supporting said lower end of said column of said material comprises a perforated shelf mounted within said container, and further including hopper means extending above said perforated shelf for reception of said column of said material supported thereby.

6. A device as in claim 5, wherein said perforated shelf supports the lower ends of a plurality of said columns of said material within said container, and wherein said hopper means includes a plurality of racks for reception of said columns of said material.

7. A device for dispersing soluble material in liquid comprising a container having an inlet, a metering valve in said container, a liquid inlet line communicating with said valve through said inlet, said valve metering a predetermined continuous flow of said liquid from said inlet line into said container while said device is in operation, an elongated perforated shelf mounted substantially horizontally within said container above the bottom thereof, a plurality of hopper racks extending substantially vertically above said shelf and said container, said hopper racks being adapted to loosely receive a plurality of upright columns of said soluble material, said columns of said material having their lower ends supported by said perforated shelf, said continuous flow of said liquid into said container raising the liquid level therein above said lower ends of said columns of said material and thereby immersing and dissolving increasing amounts of said material, said columns of said material dropping downwardly in said hopper racks as said lower ends thereof are immersed and dissolved by said liquid within said container, said container having an outlet, means for rapidly discharging said liquid from said container through said outlet upon said liquid level in said container reaching a predetermined height above said lower ends of said columns of said material, said discharge means including a siphon communicating with said outlet and mounted within said container for vertical adjustment relative thereto, whereby the extent to which said liquid immerses and dissolves said lower ends of said columns of said material prior to said rapid discharge can be varied, a calibrated scale mounted on said container, pointer means adjacent said scale carried by and movable with said siphon for indicating on said scale the maximum extent to which said liquid immerses said columns of said material at different adjustive positions of said siphon, and drain means in said container for discharging sufficient liquid therefrom when said device is inoperative as to lower said liquid level therein below said lower ends of said columns of said material.

8. A device as in claim 7, and further including inserts positionable upon said perforated shelf for supporting said lower ends of some of said columns of said material above said predetermined liquid level in said container when desired.

9. A device as in claim 7, and further including cover means for said hopper racks and said container, said cover means having a window therein for viewing said hopper racks.

10. A device as in claim 7, and further including a conduit for conducting liquid from said metering valve into said container, said conduit directing said flow of said liquid into said container substantially tangentially of a wall thereof so as to impart a swirling action to said liquid immersing said lower ends of said columns of said material.

11. A device for dispersing soluble material in liquid comprising a container having an inlet, said liquid being continuously introduced into said container through said inlet while said device is in operation, means within said container for supporting the lower end of an upright column of said material, said introduction of said liquid into said container raising the liquid level therein above said lower end of said column of said material and thereby immersing increasing amounts of said material in said liquid, means in said container for rapidly discharging said liquid from said container and thereby lowering said liquid level when said liquid level reaches a predetermined height in said container, said discharging means including a siphon slidably mounted within said container for vertical adjustment relative thereto, rotatable screw means within said container operatively connected to said siphon for vertically adjusting the position of said siphon relative to said container, whereby the extent to which said liquid immerses said column of said material prior to said rapid discharge can be varied, and drain means in said container for discharging sufficient liquid therefrom when said device is inoperative as to lower said liquid level therein below said lower end of said column of said material.

12. A device as in claim 11 wherein said container has an outlet adjacent the bottom thereof, and further including a liquid outlet fitting extending through said outlet, a leg of said siphon and said liquid outlet fitting being in partially telescoped sliding relationship to each other for adjustment of the vertical position of said siphon relative to said container.

13. A device as in claim 11, wherein said rotatable screw means for vertically adjusting the position of said siphon relative to said container comprises a screw mounted substantially vertically in said container for rotation about its longitudinal axis, an internally threaded member secured to said siphon and threadably engaged by said screw, rotation of said screw moving said internally threaded member and said siphon longitudinally of said screw and substantially vertically of said container.

14. A device for dispersing soluble material in liquid comprising a container having an inlet, said liquid being continuously introduced into said container through said inlet while said device is in operation, means within said container for supporting the lower end of an upright column of said soluble material, said introduction of said liquid into said container raising the liquid level therein above the lower end of the column of said material and thereby immersing increasing amounts of said material is said liquid, means in said container for rapidly discharging said liquid from said container and thereby lowering said liquid level when said liquid level reaches a predetermined height in said container, said discharging means including a siphon pivotally mounted in said container for vertical adjustment relative thereto, and lever means operatively connected to said siphon for vertically adjusting the position of said siphon relative to said container, whereby the extent to which said liquid immerses the column of said material prior to said rapid discharge can be varied.

15. A device as in claim 14, wherein said container has an outlet adjacent the bottom thereof, and further including a liquid outlet fitting extending through said outlet, bearing means in said container, said siphon being journaled in said bearing means for pivotal adjustment vertically of said container, and a leg of said siphon communicating with said liquid outlet fitting.

References Cited in the file of this patent
UNITED STATES PATENTS

| | | |
|---|---|---|
| 370,798 | Mackintosh | Oct. 4, 1887 |
| 618,532 | Beman | Jan. 31, 1899 |
| 967,099 | Yamashita | Aug. 9, 1910 |
| 1,066,909 | Jones | July 8, 1913 |
| 2,045,473 | Keillor | June 23, 1936 |
| 2,461,334 | Major | Feb. 8, 1949 |
| 2,471,158 | Livingstone | May 24, 1949 |
| 2,864,396 | Isreeli | Dec. 16, 1958 |
| 2,884,942 | Caldwell | May 5, 1959 |